UNITED STATES PATENT OFFICE.

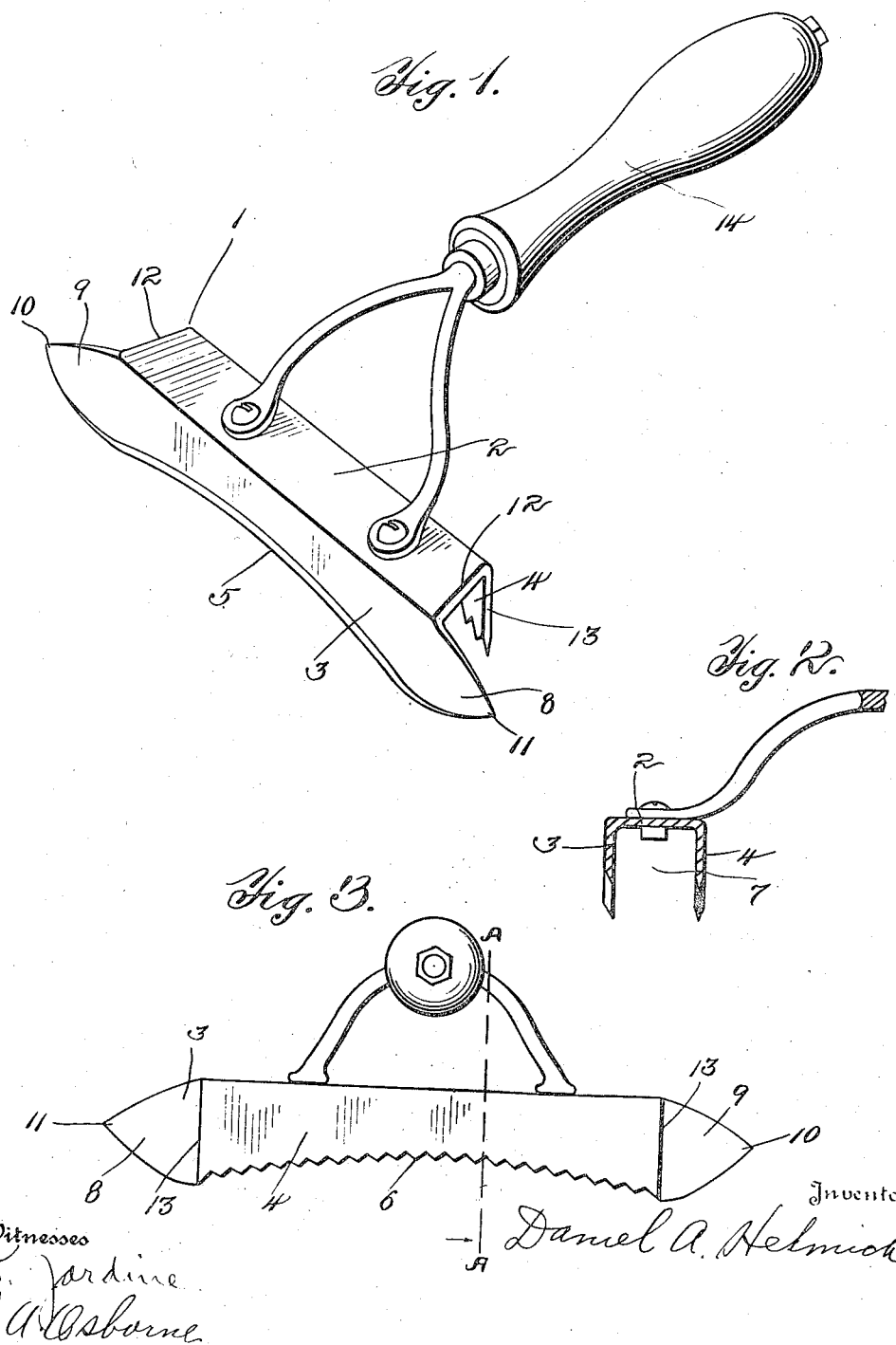

DANIEL A. HELMICH, OF BIRMINGHAM, ALABAMA.

CULINARY UTENSIL.

1,204,764.   Specification of Letters Patent.   Patented Nov. 14, 1916.

Application filed March 23, 1916. Serial No. 86,056.

*To all whom it may concern:*

Be it known that I, DANIEL A. HELMICH, a citizen of the United States, residing at Birmingham, in the county of Jefferson and State of Alabama, have invented certain new and useful Improvements in Culinary Utensils, of which the following is a specification.

This invention relates to culinary utensils and has for its object to provide a device for quickly scaling and cleaning fish.

Another object of the invention is to provide a fish scaler having an arcuate blade to conform to the contour of a fish.

Another object of the invention is to provide a fish scaler having a toothed blade for loosening the scales and a solid blade for scraping them off after being loosened.

With the above and other objects in view which will hereinafter more fully appear, I have invented the device illustrated in the accompanying drawings, in which—

Figure 1 is a perspective view of my invention, Fig. 2 is a sectional view on line A—A, Fig. 3, and Fig. 3 is a rear end elevational view.

Like reference characters indicate like parts throughout the specification and in the several views in the drawings, in which—

1 represents a fish scaling utensil, formed of a piece of sheet metal having a horizontal portion 2, the sides of which are bent down at right angles to form blades 3 and 4, the edges 5 and 6 thereof being formed arcuate longitudinally of the blades so as to fit, transversely, against the body of a fish being scaled. The edge 6, of the blade 4 is toothed to scrape the scales loose and the edge 5 of the blade 3 is a knife edge, so as to nicely clean the scales off the fish after they have been loosened. The loosening and cleaning process is done in one operation by drawing the utensil along the body of the fish, and because of the fact that the blades 3 and 4 are spaced apart, the fish scales are collected in the channel 7, between the two blades and are thus prevented from flying in every direction as is the case when fish are scaled in the usual manner.

The blade 3 has its ends 8 and 9 project beyond the body portion of the device and terminate in points 10 and 11 in order to clean close around the gills and other portions of the fish that cannot be reached by the body portion of the blades 3 and 4. These ends are also useful in splitting the fish open and as they can project into the belly of the fish only a certain distance, the edges 12 and 13 of the device acting as a gage, the chance of cutting into the fish roe is obviated. A handle 14 may be secured to the horizontal portion 2, but is not essential as the device may be used without a handle.

Having now described my invention, that which I claim to be new and desire to procure by Letters Patent is:

1. A fish scaler consisting of a pair of parallel integrally connected blades, one of which projects at both ends beyond the other.

2. A fish scaler consisting of a pair of parallel integrally connected blades, one of which projects at both ends beyond the other, the cutting edges of said blades being arcuate.

3. A fish scaler consisting of a pair of parallel integrally connected blades, one of which projects at both ends beyond the other, the cutting edges of said blades being arcuate and one of said blades having its cutting edge toothed.

4. A fish scaler consisting of a pair of parallel integrally connected blades, one of which projects at both ends beyond the other, the cutting edges of said blades being arcuate, one of said blades having its cutting edge toothed, said projecting ends having cutting edges continuous with the edge of the plate of which they form a part.

5. A fish scaler consisting of a pair of parallel integrally connected blades, one of which projects at both ends beyond the other, the cutting edges of said blades being arcuate, one of said blades having its cutting edge toothed, said projecting ends having cutting edges continuous with the edge of the plate of which they form a part and a handle mounted between said blades and being offset therefrom.

6. A fish scaler consisting of a pair of spaced apart blades, said blades having arcuate edges, one of said blades being toothed and one of said blades having flat ends projecting beyond the ends of said other blade, said projecting ends being pointed.

7. A fish scaler consisting of a pair of spaced apart blades, said blades having arcuate edges, one of said blades being toothed and one of said blades projecting beyond the ends of said other blade, said projecting ends being pointed and having knife edges continuous with the edge of the second blade.

8. A fish scaler consisting of a pair of spaced apart blades, said blades having arcuate edges, one of said blades being toothed, one of said blades projecting beyond the ends of said other blade, said projecting ends being pointed, having knife edges, and a handle mounted above said blades.

In testimony whereof I affix my signature in the presence of two witnesses.

DANIEL A. HELMICH.

Witnesses:
J. C. BRYANT,
B. A. THOMPSON.